W. H. CASTNER.
ROAD INDICATING LOG.
APPLICATION FILED NOV. 5, 1917.
1,342,793.
Patented June 8, 1920.
2 SHEETS—SHEET 1.
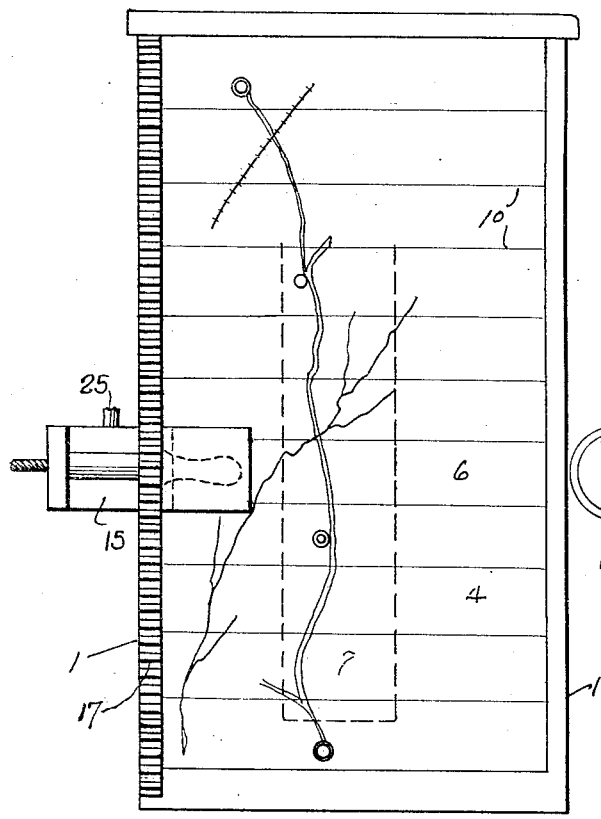
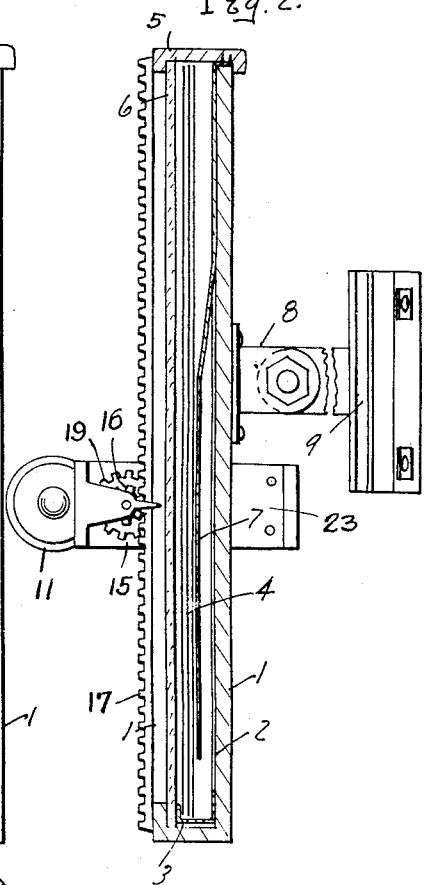
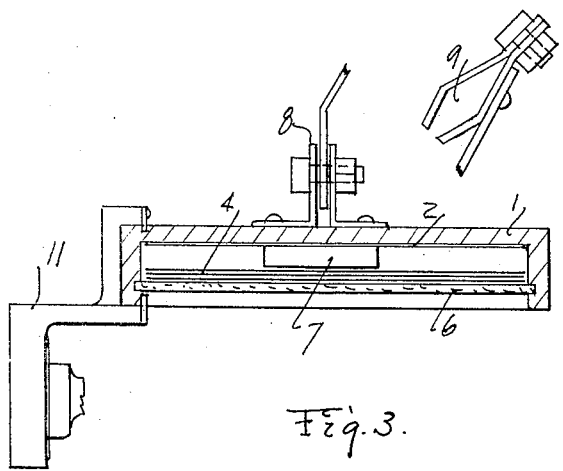
INVENTOR
William H. Castner
BY
Fred P. Goin
ATTORNEY

W. H. CASTNER.
ROAD INDICATING LOG.
APPLICATION FILED NOV. 5, 1917.

1,342,793.

Patented June 8, 1920.
2 SHEETS—SHEET 2.

INVENTOR
William H. Castner

BY
*[signature]*
ATTORNEY

UNITED STATES PATENT OFFICE.

WILLIAM H. CASTNER, OF SEATTLE, WASHINGTON, ASSIGNOR TO ROAD-A-METER COMPANY, A CORPORATION OF MONTANA.

ROAD-INDICATING LOG.

1,342,793.  Specification of Letters Patent.  Patented June 8, 1920.

Application filed November 5, 1917. Serial No. 200,309.

*To all whom it may concern:*

Be it known that I, WILLIAM H. CASTNER, a citizen of the United States, residing at Seattle, in the county of King and State of Washington, have invented certain new and useful Improvements in Road-Indicating Logs, of which the following is a specification.

This invention relates to improvements in road indicating logs and has for its principal object to provide an improved and novel device for holding or containing a plurality of road log maps for automobiles; to provide improved and novel means for indicating approximately the position of the automobile with respect to the road as indicated on the log at any particular time. Another object of my device is to provide automatic means which is driven by the movement of the automobile, for moving an approximate indicating means simultaneously with the movement of the automobile and proportionately to the scale of the map in order that the approximate position of the automobile with respect to the log at any given time will be automatically pointed out. It has become usual practice for automobiles to carry a number of log cards or maps of various roads or sections of roads over which they expect to travel. In order to be sure of one's course it is necessary to frequently consult the log and calculate your position from your speedometer reading. When traveling in an unknown country the taking care of the log and direction consumes a large part of the time of the driver or some other occupant of the car and causes some delay and inconvenience. Applicant's device is designed to adjustably support the proper log map where it may be easily read by the driver without necessitating his picking up the log. When driving at night the difficulty is much increased and for the reason applicant employs a light which is moved along with respect to the log thereby indicating by the intensity of the light within what approximate position on the log the car may be.

Other objects will appear as my invention is more fully explained in the following specification, illustrated in the accompanying drawings and pointed out in the appended claims.

Figure 5:
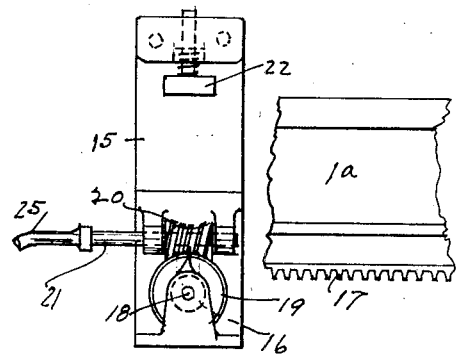
Figure 4:
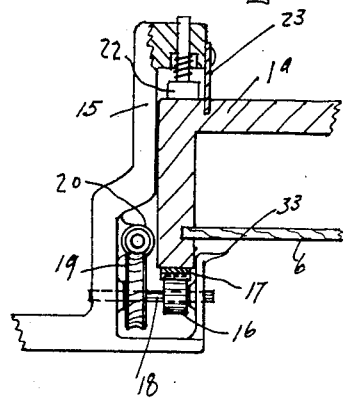
Figure 6:
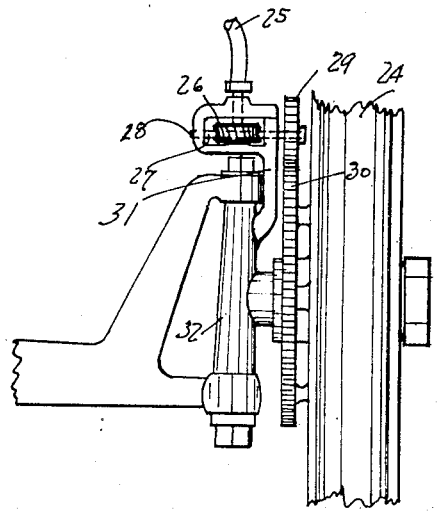

In the drawings Figure 1 is a front elevation of my device. Fig. 2 is a longitudinal cross section of same. Fig. 3 is a detail cross sectional plan of Fig. 1 with parts broken away. Fig. 4 is a detail inside view of the lamp bracket. Fig. 5 is a fragmentary elevation illustrating my device and is a continuation of Fig. 4.

Referring more particularly to the drawings numeral 1 indicates a cabinet within which a rack 2 is insertibly mounted from the top. Rack 2 has a turned up lower end 3 which engages a plurality of log cards 4 which may be mounted within the rack 2. Rack 2 is permanently secured at its upper end to a cover 5 which fits over the top of cabinet 1. A transparent face 6 is mounted in the open face of cabinet 1. A spring 7 which is integral with rack 2 holds the log cards 4 up against the transparent face 6 thereby bringing the forward log card into direct contact with the transparent face. In order to remove the log cards in order to interchange then it is only necessary to lift off cover 5 which draws rack 2 with it and when the rack has been partly withdrawn from the cabinet the action of spring 7 will draw the tops of the log cards out beyond the edge of cover 5 whereas the upper edge of transparent face 6 will prevent their dropping out so that they are in convenient position for removal or interchange. Bracket 8 which is mounted upon the rear of cabinet 1 adjustably supports an off-set clamp 9 which is normally secured to the edge of the wind-shield of an automobile or in any other convenient position so that the cabinet is in plain view of the driver. Transparent face 6 is cross lined as at 10 with straight and parallel lines of uniform spacing which are laid off proportionately to the standard scale of the logs in order that when looking at the log through the transparent face a definite number of miles, for instance ten, will be indicated approximately by the space between any given pair of lines 10. While the distance between any pair of lines will vary slightly with the crookedness of the road, yet the approximation will ordinarily be close enough for the purpose in hand, namely, that of assisting the driver in more easily pointing out to him upon what particular part of the log map he should look to find his location at that time, and to calculate roughly his distance to any particular point in either direction along the road without the necessity of adding and subtracting mileage. For night use a lamp holder 11 on bracket 15, is mounted to move on cabinet 1 and contains a lamp.

The device automatically moves the light holder with respect to the transparent face 6 and with respect to the log in proportion to the distance traveled by the automobile. A lamp carriage 15 is slidably mounted along one edge of cabinet 1 and supports a pinion 16 which normally engages a rack 17 which in turn is secured along the edge of cabinet 1. Pinion 16 is secured to a shaft 18 to which is also secured a worm wheel 19. Worm wheel 19 coöperates with a worm 20 which is secured to a shaft 21 mounted in brackets on carriage 15. A spring actuated follower 22 is mounted in carriage 15 opposite to pinion 16 and normally bears against and slides along the back of cabinet 1ª. The purpose of follower 22 is to normally hold the carriage 15 with respect to the cabinet 1ª so that pinion 16 is held in mesh with rack 17. A guide strip 23 is slidably secured to carriage 15 and engages a groove in the back of cabinet 1ª to prevent sidewise movement of the carriage. When it is necessary to manually move or adjust the position of the carriage with respect to the cabinet 1ª it is only necessary to pull the carriage forward against the resistance of the spring follower in order to disengage the pinion 16 from the teeth of the rack 17 thereby permitting free sliding of the carriage along the side of the cabinet. This manual adjustment is made necessary when the logs are changed or to make approximate corrections for allowance for mileage or for slight differences in the actual mileage and the space between any two adjacent lines 10. Worm shaft 21 is driven directly from a traction wheel 24 on the automobile by means of a flexible shaft 25 (one end of shaft 25 is shown in Fig. 4 and the other end in Fig. 5) and through the medium of a worm pinion 26 and worm 27 the latter of which is secured to shaft 28 to which a spur pinion 29 is also secured. Pinion 29 coöperates with a spur gear 30 which is secured to traction wheel 24. The members 26, 27 and 28 and 29 are carried on a bracket 31 which is integral with a wheel supporting bracket 32 upon which traction wheel 24 is mounted. It will be understood that the ratio between the movement of a pointer 33 on carriage 15 and a traction wheel 24 is the same as the ratio between the actual road measurement and the scaled mileage as indicated on the log. This fixes the travel of the carriage as indicating a close approximation on the log map to the actual mileage driven.

While I have shown a particular form of embodiment of my invention, I am aware that many minor changes therein will readily suggest themselves to others skilled in the art without departing from the spirit and scope of the invention, and I therefore desire to avoid being limited to the exact form shown and described. Having described my invention, what I claim as new and desire to protect by Letters Patent, is:—

Claims:

1. In an apparatus for indicating the position of a vehicle relative to a point indicated on a road log map, the combination of a cabinet open on one face and containing road log maps, a rack bar in one side of the cabinet, a lamp holder comprising a frame, a shaft mounted in the frame, a pinion on the shaft to engage with the rack, means for rotating the shaft, a guide between the rack and the cabinet, a resiliently mounted plunger between the frame and the cabinet to normally hold the pinion in mesh with the rack, and to permit of disengagement of the pinion from the rack, and a lamp carried by the frame to illuminate the road log map.

2. In an apparatus for indicating the position of a vehicle relative to a point indicated on a road log map, the combination of a cabinet open on one face and containing road log maps, a rack bar in one side of the cabinet, a lamp holder comprising a frame bent at its front to engage the inner surface of the side of the cabinet and shaped to form a pointer, a shaft mounted in the frame, a pinion on the shaft to engage with the rack, means for rotating the shaft, a guide strip secured to the rear portion of the frame and slidably mounted in a groove formed on the rear of the cabinet, a plunger mounted in the rear of the frame and bearing on the rear of the cabinet, a spring interposed between the frame and the head of the plunger to normally hold the pinion in mesh with the rack, and means for rotating the shaft.

In testimony whereof I affix my signature in the presence of two witnesses.

WILLIAM H. CASTNER.

Witnesses:
 ROCKWOOD BROWN,
 GERTRUDE HASKELL.